United States Patent [19]

Ogilvie et al.

[11] Patent Number: 4,459,460

[45] Date of Patent: Jul. 10, 1984

[54] GENERATOR OF HIGH CURRENT PULSES

[75] Inventors: Graeme J. Ogilvie, Romsey; Ian M. Ogilvy, East Brighton; Anton Schubert, St. Albans, all of Australia

[73] Assignee: Commonwealth Scientific and Industrial Research Organization, Campbell, Australia

[21] Appl. No.: 520,222

[22] PCT Filed: Sep. 11, 1980

[86] PCT No.: PCT/AU80/00064
§ 371 Date: May 6, 1981
§ 102(e) Date: May 6, 1981

[87] PCT Pub. No.: WO81/00799
PCT Pub. Date: Mar. 19, 1981

Related U.S. Application Data

[63] Continuation of Ser. No. 261,208, May 6, 1981, abandoned.

[51] Int. Cl.³ .............................................. B23K 9/09
[52] U.S. Cl. ............................ 219/130.51; 219/130.21
[58] Field of Search ..................... 219/137 PS, 130.51, 219/130.21

[56] References Cited

U.S. PATENT DOCUMENTS

| | | | |
|---|---|---|---|
| 3,350,539 | 10/1967 | Manz et al. | 219/137 PS |
| 3,459,920 | 8/1969 | Sevenco | 219/137 PS |
| 3,809,853 | 5/1974 | Manz | 219/137 PS |
| 3,999,034 | 12/1976 | Barhorst | 219/130.51 |
| 4,020,320 | 4/1977 | Pijls et al. | 219/130.21 |

FOREIGN PATENT DOCUMENTS

| | | |
|---|---|---|
| 2050048 | 4/1972 | Fed. Rep. of Germany . |
| 2213872 | 10/1973 | Fed. Rep. of Germany . |
| 2351652 | 4/1975 | Fed. Rep. of Germany . |
| 2648480 | 5/1977 | Fed. Rep. of Germany . |
| 95162 | 7/1970 | France ............................ 219/130.51 |
| 1334734 | 10/1973 | United Kingdom . |
| 1336333 | 11/1973 | United Kingdom . |
| 1395938 | 5/1975 | United Kingdom . |
| 1437107 | 5/1976 | United Kingdom . |
| 1527032 | 10/1978 | United Kingdom . |

OTHER PUBLICATIONS

Payne, R. A. & Reeves, E. S., "Switch-off Circuits for SCR's Operating on DC", Mullard Technical Communication No. 65, Jun. 1963, 158–161.

Lawrence, B. D. and Jackson, C. E., "Variable Frequency Gas Shielded Pulsed Current Arc Welding", Welding Journal Res. Supp. 48, 1969, 97s–104s.

Smith, G. A. and Brown, M. J., "An Inverter Power Source for Welding Applications", 2nd International Conference on Power Electronics–Power Semiconductors and their Applications, London, England: IEE 1977, 58–61.

Lowery, J., "A New Concept for AC/DC Power Sources for TIG-Welding," Advances in Welding Processes, 4th International Conference, Harrogate, England, May 4th–11th, 1978, 161–169.

Grist, F. J., "Improved, Lower Cost Aluminum Welding with Solid State Power Source", Welding Journal 54, 1975, 348–357.

Primary Examiner—C. C. Shaw
Attorney, Agent, or Firm—Cushman, Darby & Cushman

[57] ABSTRACT

A circuit for pulsing the output of a dc power supply (2) connected across a load such as a welding arc. The circuit has a first SCR (12) connected in parallel with a resistor (14). The SCR (12) controls the pulse current and the resistor (14) controls the background current. Each pulse is terminated by the action of a second SCR (18) and a capacitor (16) connected across the first SCR (12) by applying a control pulse to the gate of a second SCR (18). The capacitor (16) is charged by a power supply (20) and is connected by the second SCR (18) so that the first SCR (12) is reverse biased and hence is turned off to terminate the pulse. Immediately the first SCR (12) turns off, the capacitor (16) is charged in the opposite sense to the charge derived from the power supply (20) and this in turn causes the second SCR (18) to be reversed biased by conduction through the resistor (14) and turned off a short time after the first SCR (12) is turned off. The circuit permits control of individual pulses and pulse trains in accordance with variations in any of a range of external control variables.

10 Claims, 5 Drawing Figures

GENERATOR OF HIGH CURRENT PULSES

This application is a continuation of application Ser. No. 261,208 filed May 6, 1981, now abandoned.

BACKGROUND OF THE INVENTION

This invention relates to a circuit for producing large pulses of electric current especially useful in welding.

Pulsed electric currents of high value are used in many applications, a particularly important one is in welding including spot welding. Other important applications include pulsed electroplating, D.C. to D.C. inverters, D.C. electric motor speed controls and surface hardening by pulsed arcs. In these applications an approximately square wave current pulse is desired and current pulses of up to 10,000 amp may be required. It is for such large current pulses that silicon control rectifiers ((SCR's) are most appropriate as solid state switching devices.

The preferred embodiment of the invention to be described uses SCR's as switching elements in its circuit which is used to control the output of a dc power supply of conventional nature and the one pulse unit can be used with a wide range of power supplies such as motor generator sets, lead-acid storage batteries and transformer-rectifier units. In this fashion the cost of installing pulsed welding facilities, for example, is significantly reduced because continuous current welding power supplies which have already been installed, can be used with the pulsing unit.

LAWRENCE, B. and JACKSON, C. in 1969 Variable Frequency Gas Shielded Pulse Current Arc Welding. Welding Journal Res. Suppl. 48 1969, 97s-104s. reported a study of pulsed current arc welding in which the influence of the pulse current frequency, duration and magnitude on the mode of metal transfer in the MIG (metal-inert gas) arc was determined. This experimental equipment used SCR's switching the output of a dc power supply with the control pulses to the gates of the SCR's being obtained from a mechanical commutator. In order to maintain a continuous standing current so that the arc did not go out at the end of the current pulse a second power supply was used. The use of a mechanical commutator and multiple power supplies would not now be seen as elegant design. Furthermore the switching circuit which used two SCR's functioned in a bistable mode of operation in which each SCR was used to turn the other off alternately. The larger SCR controlled the arc pulse current and the smaller SCR conducted for the time that the arc current pulse was not flowing. This method of operation is not only inefficient but also enhances the problem of disposal of surplus heat produced by the pulse generator.

Two other pulse shaping units for welding have been described which switch the output of a welding power supply, SMITH G. A. and BROWN, M. J. An Inverter Power Source for Welding Applications. 2nd International Conference on Power Electronics—Power Semiconductors and their Applications. London England: I.E.E. 1977 58-61, and LOWERY, J. A New Concept for AC/DC Power Sources for TIG-Welding. Advances in Welding Processes 4th International Conference Harrogate England, 4th-11th May 1978, 161-169. These designs have been developed specifically for TIG (tungsten-inert gas) welding of aluminium for which application it is highly advantageous to have the current through the arc alternating thus producing a cleaning action on the workpiece surface by ion bombardment when it is biased negative with respect to the tungsten electrode. Each pulse unit is of fixed frequency (50 or 60 Hz). The cleaning effect as well as the weld penetration and heat input to the workpiece are changed (but not independently) by varying the ratio of the durations of the positive and negative half cycles of current.

Another device described by GRIST, F. J., Improved, Lower Cost Aluminium Welding with Solid State Power Source. Welding Journal. 54 1975, 348-357, is generally similar to those mentioned immediately above but offers in addition limited control of the frequency of operation (50-200 Hz). This frequency limitation is imposed by the use of a resonant commutation circuit for the SCR's.

One of the shortcomings of the above and other known circuits is that the control of the switching of the current pulses may be dependent on parameters which do not reflect the conditions at the arc itself.

The object of the present invention is to provide a circuit for generating current pulses of up to at least 10,000 amps in which the switching of the current pulses is controlled in accordance with the voltage at the load.

SHORT STATEMENT OF THE INVENTION

According to the present invention, there is provided a circuit for generating current pulses in a dc power supply (2) comprising a switchable element (12) connected to said power supply (2) and to a load, control means for controlling the state of said switchable element (12) whereby a relatively heavy current pulse is allowed to flow through the load while said switchable element (12) is in its on state, and means (14) for supplying a relatively light background current to the load while said switchable element (12) is in its off state, said control means including trigger means (82, 86) for generating control signals for controlling the state of said switchable element (12) and a voltage sensing circuit (80, 84) for sensing the voltage across said load and causing said trigger means (82, 86) to generate a control signal to switch said switchable element (12) to its on state when said sensed voltage is at a predetermined low level and to switch said switchable element (12) to its off state when said sensed voltage reaches a predetermined high level.

BRIEF DESCRIPTION OF THE DRAWINGS

The invention will now be further described with reference to the accompanying drawings, in which.

DETAILED DESCRIPTION OF THE PREFERRED EMBODIMENTS

Figure 1:
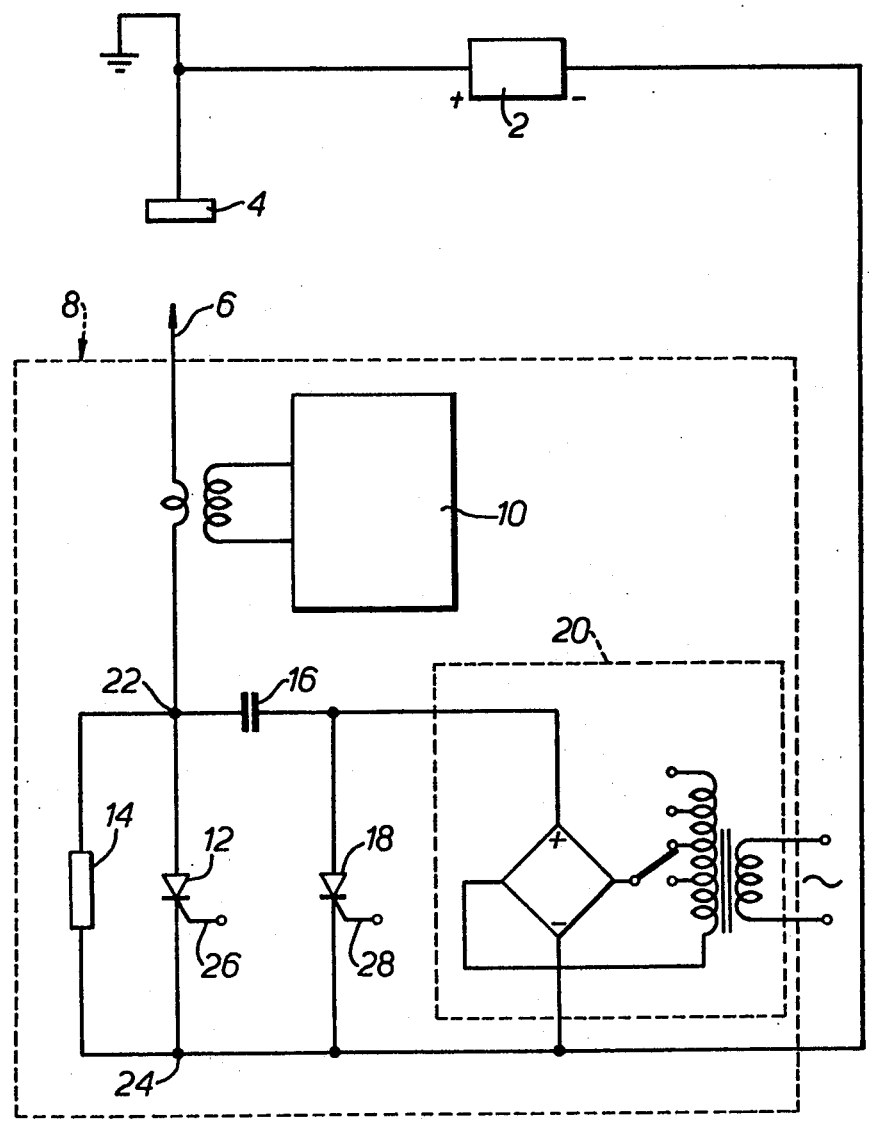
FIG. 1 is a simplified circuit diagram of the pulse generator of the invention.

The circuit illustrated in FIG. 1 is for use in pulsed welding operations, the circuit showing a conventional welding current supply apparatus 2 having its positive output connected to a work piece 4 and its negative output connected to an electrode 6 through the pulse circuit 8 of the invention. The circuit 8 includes a high frequency starting circuit 10 for initiating an arc between the electrode 6 and the work piece 4. The circuit includes a primary SCR 12 which is of large capacity and carries the full arc current, when the arc current flows. A resistor 14 is connected across the primary SCR 12 so as to provide a standing arc current in the range say 20 to 60 amp at those times when the remainder of the circuit would not permit current flow. The value of resistor 14 would typically be 0.5 ohm. The circuit further includes a capacitor 16 and secondary SCR 18 which are connected in a branch across the SCR 12. The circuit also includes a secondary power supply 20, the positive output of which is connected to the junction of the capacitor 16 and secondary SCR 18, the main function of the secondary power supply 20 being to supply charging current to the capacitor 16.

Figure 2:
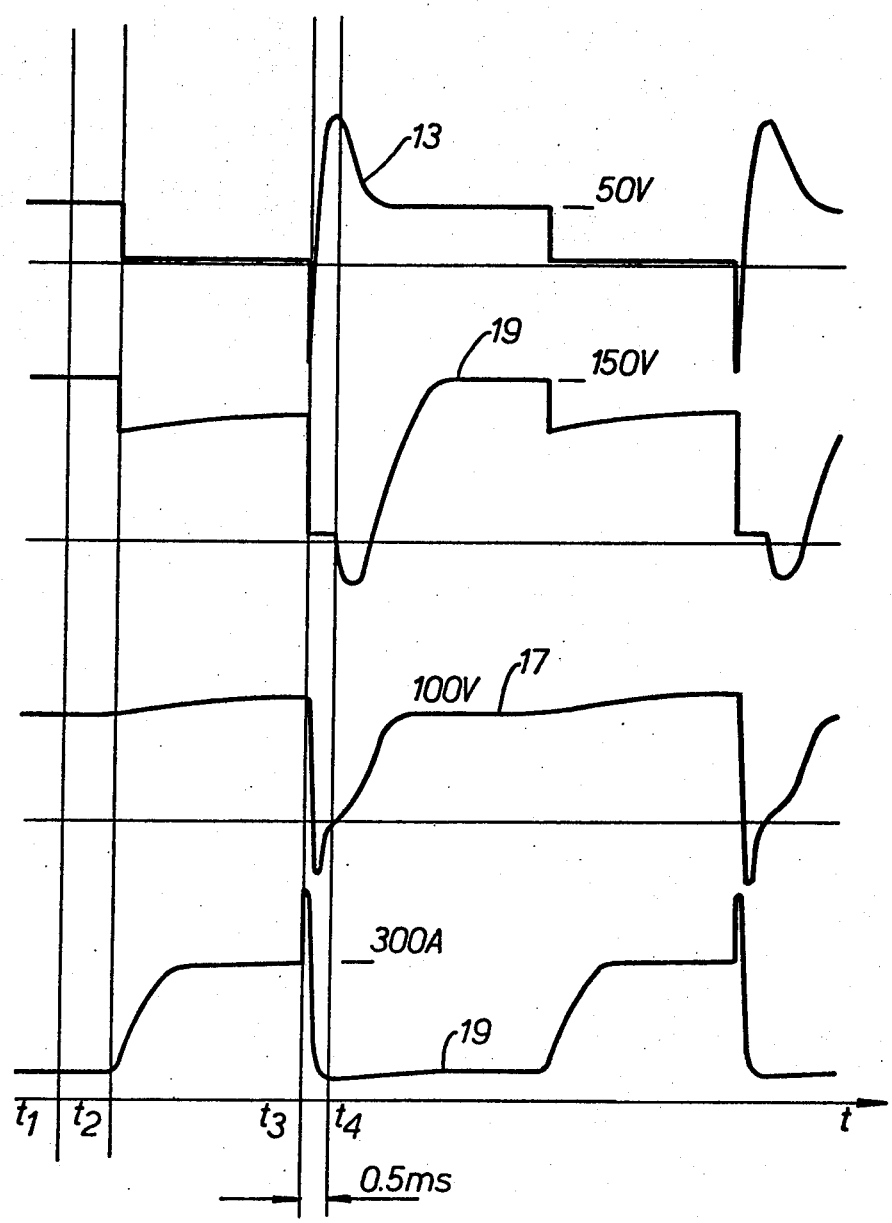
FIG. 2 is a waveform diagram useful in understanding the operation of the circuit of FIG. 1.

The operation of the circuit will now be described with reference to FIG. 2. The waveforms 13, 19 and 17 represent the voltages across SCR 12, SCR 18 and capacitor 16 respectively, and the waveform 19 represents the arc current flowing between the workpiece 4 and the electrode 6.

When the power supplies are switched on, the SCR's 12 and 18 are not conducting and the capacitor 16 is charged by power supply 20 through resistor 14, and SCR 18 is biased in the forward direction ($\simeq$150 volt). When the arc is initiated by the HF starting circuit 10, the current through it is controlled by the value of resistor 14. At the same time the potential of the point 22 in the circuit with respect to the common point 22 rises because of the voltage drop across resistor 14 due to the arc current passing through it. The circuit is then in the condition indicated at time $t_1$ in FIG. 2.

A control pulse generated in a manner to be described in greater detail below is applied to the gate 26 of SCR 12 at time $t_2$ to initiate conduction and the voltage across it falls to about 1 volt so that nearly all the arc current passes through it. The arc current rises to a new value determined essentially by the electrical characteristics of the supply apparatus 2 and the arc voltage. The rapidly falling voltage across SCR 12 causes a rapid drop in the voltage across SCR 18 followed by a slower rise as power supply 20 charges capacitor 16. The rate of rise of the arc current is limited by the impedance of supply apparatus 2.

The arc current pulse is terminated at time $t_3$ by applying a control pulse to the gate 28 of SCR 18. When SCR 18 conducts, the capacitor 16 is connected across SCR 12 in a low impedance circuit causing SCR 12 to be immediately turned off by the reverse bias due to the capacitor 16. At the same time the full arc current flows to the capacitor for discharging it and then reversing its polarity. The voltage across the arc is momentarily increased producing a spike in the arc current followed by a rapid fall to below the standing current level with a subsequent return to that level.

At the same time the capacitor 16 is connected across SCR 18 through a resistor 14 tending to reverse bias SCR 18. This tendency is opposed by the power supply 20. If the impedance of the power supply 20 is sufficiently high (and this condition is almost automatically guaranteed because the supply has to be able to withstand the near short circuit condition imposed by SCR 18) the influence of the reverse bias of the capacitor prevails and SCR 18 is turned off. Between times $t_3$ and $t_4$ SCR 18 is still forward biased at 0.7 volt because its reverse recovery current inhibits the reverse bias. At time $t_4$ its recovered charge requirement is satisfied allowing the bias on SCR 18 to become negative until recharging of capacitor 16 by the power supply 20 becomes the dominant process and then the voltages on SCR's 12 and 18 and capacitor 16 return to the values at time $t_1$.

A prototype of this circuit has been tested and found to perform in a most satisfactory manner. In the prototype arrangement the value of the capacitor 16 was 525 $\mu$F and the value of the resistor 14 was 0.5 ohm. The voltage output of power supply 20 is approximately 110 volts. Generally speaking, the higher the value of the voltage of supply 20 the smaller the value of capacitor 16. Of course the smaller the output of supply 20 the smaller is the current drain therefrom.

Figure 3:
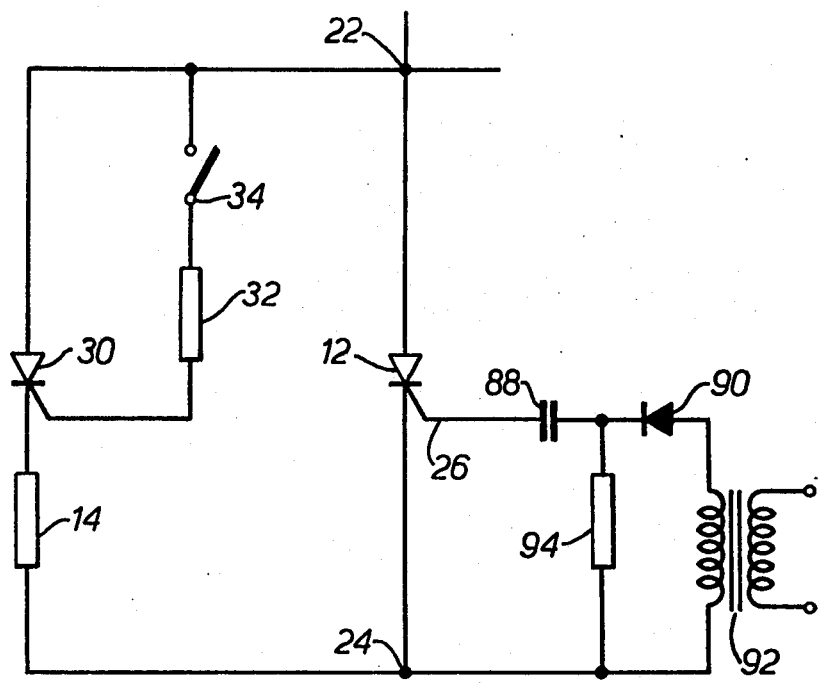
FIG. 3 illustrates a modified circuit.

A preferred addition to the circuit is indicated in the schematic circuit of FIG. 3 where the components SCR 30, resistor 32 and switch 34 are added to the branch of the circuit containing resistor 14. With the switch 34 open SCR 30 does not conduct and consequently the standing current can not flow through resistor 14. With switch 34 closed SCR 30 always conducts current when SCR 12 is off so that the standing current, limited by the value of resistor 14 is able to pass. The value of resistor 32 is chosen so that the current flowing to the gate of SCR 30 is always within its specified range. The function of the circuit addition is to allow the main power supply to be left on and yet have no voltage on the output terminals provided power supply 20 is inactivated. This is important in welding applications where switch 34 can be on the welding head to improve operator safety and convenience. The circuit will operate cyclically in this manner provided appropriate pulses are applied to the gates 26 and 28 of the SCR's, and the generation of such pulses will be described with reference to FIGS. 4 and 5.

Figure 4:
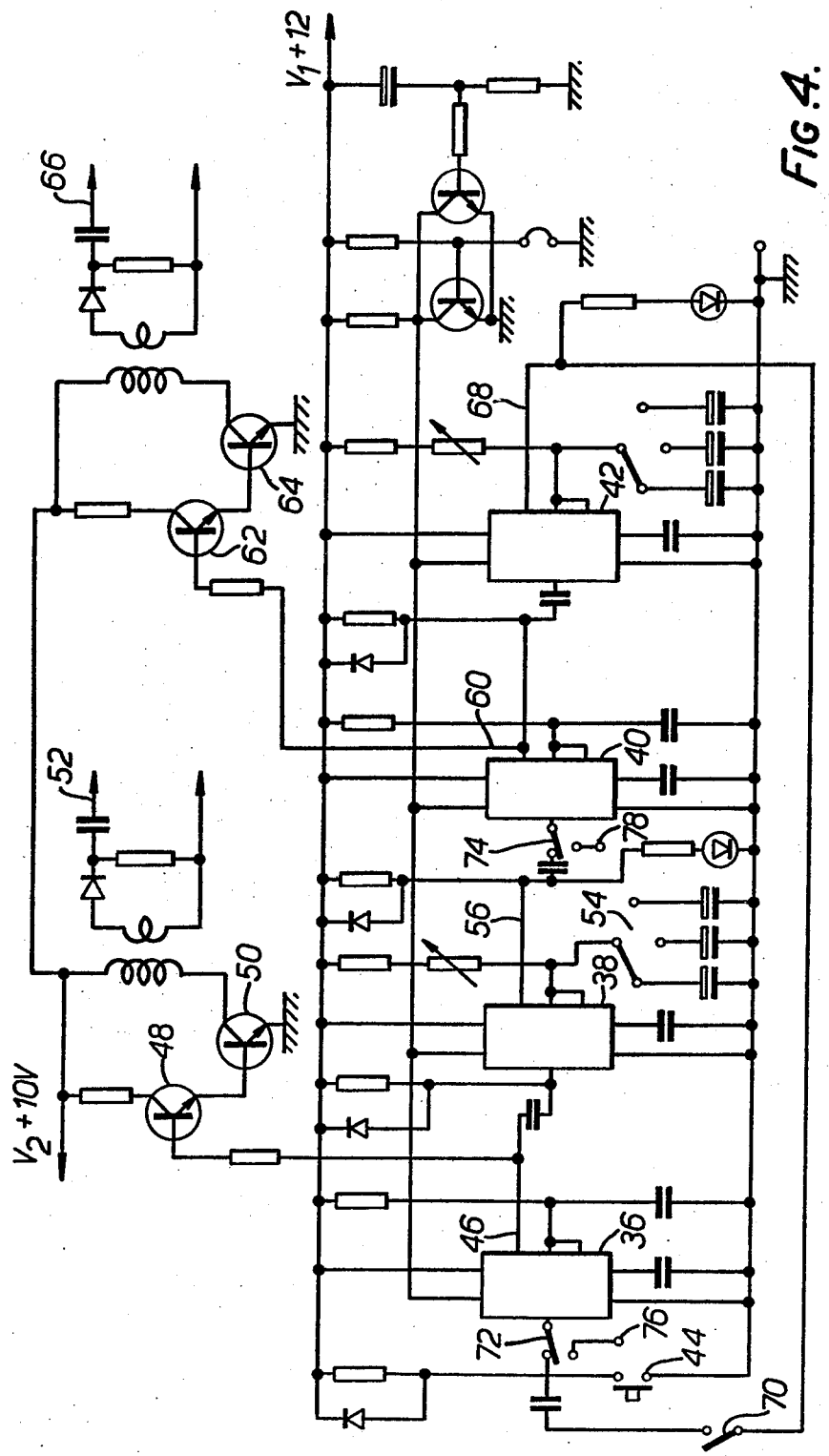

FIG. 4 illustrates a suitable control circuit for generating gate pulses for the gates 26 and 28 of the SCR's 12 and 18 which may if desired be operated in a manner which is not preferred, independently of the voltage of the arc. The circuit basically comprises four monostable circuits (NE555 integrated circuits) 36, 38, 40 and 42. When a switch 44 is closed the monostable circuit 36 will produce a pulse at its output 46 after a predetermined period. The pulse at the output 46 will turn on transistors 48 and 50 which will in turn produce a suitable pulse at the point 52 which is connected to the gate 26 of the SCR 12 and so turn that SCR on. Output from the monostable circuit 36 is applied to the input of the second monostable circuit 38 and after a predetermined delay depending on the setting of switch 54, the circuit 38 will produce an output pulse at its output 56 which is applied to the input of the third monostable circuit 40. After a predetermined delay, the circuit 40 will produce a pulse on its output 60 which turns on transistors 62 and 64 thereby producing a pulse at the point 66 which is connected to the gate 28 of the SCR 18. This corresponds to the time $t_3$ of FIG. 2 and the capacitor 16 will be discharged thereby turning SCR 12 off. The output of the monostable circuit 40 is applied to the input of the fourth monostable circuit 42, the output 68 of which is fed back via a switch 70 to the input of the first monostable circuit 36 so that if the switch 70 is closed the circuit will cyclically produce gate pulses for the SCR's 12 and 18.

The above described operation of the control circuit shown in FIG. 4 is modified in accordance with the present invention so that it does not cycle in a selective period but is triggered in response to an external source. One particularly convenient source for such triggering signals would be the magnitude of the arc voltage. To effect this selector switches 72 and 74 are connected to the inputs of the first and third monostable circuits 36 and 40. If the selector switches 72 and 74 are moved so as to connect with terminals 76 and 78, externals pulses applied to those terminals can be used for triggering arc current pulse off or arc current pulse on respectively.

Figure 5:
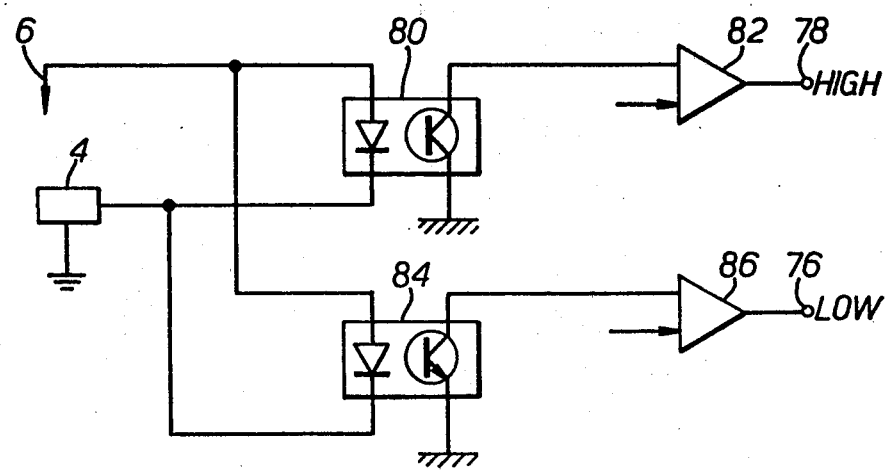
FIGS. 4 and 5 illustrate control circuitry for generating gate pulses.

FIG. 5 shows a simplified circuit for generating control signals which are responsive to the arc voltage i.e. the voltage between the electrode 6 and the workpiece 4. The circuit includes a first opto-coupler 80 the input of which is directly connected across the electrode 6 and workpiece 4, the output being connected to a first input of a comparator 82. A selectable reference level is applied to the other input of the comparator and the output is connected to the terminal 78 shown in FIG. 4. The circuit includes a second opto-coupler 84 connected to a second comparator 86 the other input of which has applied thereto a second reference level and the output of the comparator 86 is connected to the terminal 76 shown in FIG. 2. A particularly useful arrangement for the circuit shown in FIG. 5 would be to set the comparator 82 so that it produces an appropriate pulse at its output when the arc voltage reaches a predetermined level. The second comparator 86 would be set so that it would produce an appropriate output when the arc voltage falls below a predetermined value. The generation of such signals can provide very useful controls for welding operations.

Returning to FIG. 3, that part of the circuit illustrates a further modification which is designed to reduce the possibility of unwanted triggering of SCR 12 due to stray pulses which are sometimes generated when other SCR's in a circuit are themselves triggered. In this arrangement a phase shifting element namely capacitor 88 is connected in series with the gate electrode 26. The circuit also includes a steering diode 90 in series with the secondary of a pulse transformer 92 which receives appropriate pulses from the point 52 of the control circuit shown in FIG. 4. It is necessary to include a resistor 94 to prevent charging of the capacitor 88 with consequent reduction of pulse amplitudes being delivered to the gate electrode 26.

The principal advantages of the preferred embodiment of the invention are as follows:

1. A separate power supply 20 is used to charge the commutating capacitor 16. This permits a voltage higher than the arc voltage to be used thus ensuring that switching continues reliably even if the arc is very short or short circuited. In addition, the capacitance of capacitor 16 can be reduced progressively as the voltage of supply 20 is increased.

2. The power supply 20 in a preferred embodiment comprises a slightly reactive transformer and a full wave rectifier. This prevents excessive current drain when SCR 18 is on and permits another monostable mode of operation as described in the next section. It need only have a nominal rating of about 500 watts, which is much lower than prior art devices.

3. SCR 12 is bypassed by the resistor 14 which also has a twofold function. Firstly it eliminates the need for a second power supply as used in known SCR pulse units connected to the output of the power supply. Secondly, it is vital to allow this unit to operate as a monostable rather than a bistable device. This reduces the power which has to be dissipated in the unit during operation. If resistor 14 is omitted another mode of operation is possible, this requires that the power supply 20 be unfiltered (with resistor 14 present in the circuit, the capacitor 16 acts as a filter condenser for the supply). In this mode of operation after SCR 18 is triggered on, it will remain on until the next current zero of the power supply when, if it is sufficiently fast, it will turn off. This method imposes a variable delay before SCR 18 can turn off after commutating off SCR 12 and consequently limits the maximum repetition rate of the switching circuit. At a sufficiently high repetition rate SCR 12 is triggered on before the next current zero of power supply 20; the switching is then similar to the mode used in the pulse unit devised by LAWRENCE, B. and JACKSON, C.

4. The arc voltage is monitored by the machine and the control is capable of switching the pulse current on at one selected value and off again at another selected value of arc voltage where (in general) the latter voltage is higher than the former.

There are two alternate modes of operation and both of these depend on the use of an electrode wire which is being fed at constant speed towards the weld pool.

These modes are:
 (a) the pulse current is switched on at a selected voltage and the length of the pulse is controlled by a timer,
 (b) the pulse current is switched on at a selected arc voltage and switched off again at a selected higher voltage.

Mode (a) is appropriate for extending the range of the dip transfer process. The dip transfer or "short arc" welding procedure is particularly appropriate to out of position (e.g. vertical and overhead) welding and for the arc welding of thin sheet. In this mode the sensing of the contact of the electrode end to the weld pool then initiates a pulse of current which lasts for a predetermined time. This enables more power to be delivered to workpiece (by increasing the length of the pulse) and so inhibit the greatest problem of the dip transfer process—namely its tendency to cause lack of fusion defects.

Mode (b) is suitable for MIG and submerged arc processes. Another useful application of mode (b) would be for welding, particularly aluminium, whereas spatter increases finishing costs.

The small spatter drops usually are emitted by an explosive disruption of the bridge between a departing liquid metal drop and the electrode. It is thought that the problem can be controlled by reducing the arc current to a low value during the separation of the drop from the electrode.

We claim:

1. A circuit for generating by a power supply (2) arc current pulses for welding comprising:
 a workpiece (4);
 an electrode (6); and
 means for establishing an arc across said workpiece (4) and said electrode (6), said arc establishing means including a switchable element (12) connected to said power supply (2) and to said electrode (6), and control means for controlling the state of said switchable element (12) to maintain said current pulse, a relatively heavy current pulse being allowed to flow through the arc while said switchable element (12) is in its on state, and a relatively low current being allowed to flow through the arc while said switchable element (12) is in its off state, said control means including a trigger means (82, 86) for generating first and second control signals for controlling the state of said switchable element (12) and a voltage sensing circuit (80, 84) connected to sense a voltage representing a parameter across the arc, said voltage sensing circuit (80, 84) being connected to said trigger means (82, 86) to cause said trigger means (82, 86) to generate a first control signal to switch said switchable element (12) to its on state when said sensed voltage is at a predetermined low level and generate a second control signal to switch said switchable element (12) to its off state when said sensed voltage reaches a predetermined high level.

2. A circuit as claimed in claim 1, wherein said voltage sensing circuit (80, 84) includes a comparator circuit (82, 86) for generating said control signals, said comparator circuit including means for applying predetermined reference voltage levels to said comparator circuit whereby said control signals are generated when said predetermined voltage levels are detected.

3. A circuit as claimed in claim 1 or 2, wherein said circuit comprises first and second parallel branches, said first branch including an impedance (14) having a predetermined resistive value, said second branch having a low impedance path including said switchable element (12) whereby when said switchable element (12) is in its off state, said relatively light background current flows through said first branch and said load.

4. A circuit as claimed in claim 3, wherein said switchable element comprises a first SCR (12) connected in parallel with said impedance (14), said circuit further comprising a capacitor (16) and a second SCR (18) connected in a branch across said first SCR (12), said first control signal being applied to the gate of said first SCR (12) to switch said first SCR (12) to its on state, said second control signal being applied to the gate of said second SCR (18) to switch said second SCR (18) to its on state and to connect said capacitor (16) across said first SCR (12) whereby said first SCR (12) is in use switched to its off state by the reverse bias applied by the charge stored in the capacitor (16).

5. A circuit as claimed in claim 4, further comprising a secondary power supply (20) connected to said capacitor (16) to supply charging current to said capacitor (16), said power supply (20) having a high output impedance.

6. A circuit as claimed in claim 4, wherein said capacitor (16) is connected to be reverse charged by the current flowing to the load when said first SCR (12) is turned to its off state, said capacitor (16) reverse biasing said second SCR (18) to turn said second SCR (18) to its off state.

7. A circuit as claimed in claim 1 or 2, wherein said switchable element comprises a first SCR (12) connected in parallel with an impedance (14), said circuit further comprising a capacitor (16) and a second SCR (18) connected in a branch across said first SCR (12), said first control signal being applied to the gate of said first SCR (12) to switch said first SCR (12) to its on state, said second control signal being applied to the gate of said second SCR (18) to switch said second SCR (18) to its on state and to connect said capacitor (16) across said first SCR (12) whereby said first SCR (12) is in use switched to its off state by the reverse bias applied by the charge stored in the capacitor (16).

8. A circuit as claimed in claim 7, further comprising a secondary power supply (20) connected to said capacitor (16) to supply charging current to said capacitor (16), said power supply (20) having a high output impedance.

9. A circuit as claimed in claim 7, wherein said capacitor (16) is connected to be reverse charged by the current flowing to the load when said first SCR (12) is turned to its off state, said capacitor (16) reverse biasing said second SCR (18) to turn said second SCR (18) to its off state.

10. A circuit as claimed in claim 1 or 2, wherein said power supply (2) comprises welding apparatus and said load comprises an arc struck between an output electrode (6) of the welding apparatus and a workpiece (4).

* * * * *

UNITED STATES PATENT AND TRADEMARK OFFICE
CERTIFICATE OF CORRECTION

PATENT NO. : 4,459,460

DATED : July 10, 1984

INVENTOR(S) : Graeme J. Ogilvie; Ian M. Ogilvy; and Anton Schubert

It is certified that error appears in the above-identified patent and that said Letters Patent is hereby corrected as shown below:

On the title page;

The patent should include the following data:

[30] Foreign Application Priority Data

Sept. 11, 1979 [AU] Australia .......... PE 0450/79

Signed and Sealed this

Twenty-third Day of July 1985

[SEAL]

Attest:

DONALD J. QUIGG

*Attesting Officer*  *Acting Commissioner of Patents and Trademarks*